United States Patent [19]

Jonovic et al.

[11] Patent Number: 4,684,040
[45] Date of Patent: Aug. 4, 1987

[54] ROTARY VOLUMETRIC PISTON DISPENSER WITH ADJUSTABLE CAMMING ASSEMBLY, AND RINSING DEVICE

[75] Inventors: John A. Jonovic, Fitchburg; Bruce W. Stengel, DeForest; Timothy G. Mally, Oregon, all of Wis.

[73] Assignee: Oscar Mayer Foods Corporation, Madison, Wis.

[21] Appl. No.: 775,477

[22] Filed: Sep. 12, 1985

[51] Int. Cl.⁴ .............................................. G01F 11/06
[52] U.S. Cl. ................................ 222/148; 134/166 R; 141/91; 141/259; 222/218; 222/221; 222/292; 222/306; 222/368; 425/241
[58] Field of Search ............... 222/148, 149, 216–218, 222/221, 254, 282, 284, 287, 288, 291–293, 367, 368, 344–347, 349, 352, 434–436, 438, 444, 450, 305, 306, 338; 221/233, 234; 141/135, 144, 258, 90, 91, 259; 425/107, 416, 238–241, 236, 335; 137/15; 134/166 R, 169 R

[56] References Cited

U.S. PATENT DOCUMENTS

| | | | |
|---|---|---|---|
| 2,097,887 | 11/1937 | Lacey | 222/218 X |
| 2,651,808 | 9/1953 | Burnett et al. | 222/218 X |
| 2,888,963 | 6/1959 | Guyer | 222/221 X |
| 2,913,018 | 11/1959 | Lewis, Jr. et al. | 141/91 |
| 3,513,024 | 5/1970 | Culliton | 141/91 X |
| 3,558,016 | 1/1971 | Beinhofer | 222/218 |
| 3,578,217 | 5/1971 | Miller | 222/218 |
| 3,656,518 | 4/1972 | Aronson | 222/218 X |
| 3,946,750 | 3/1976 | Fischer et al. | 134/169 R X |
| 4,542,835 | 9/1985 | Gamberini | 222/218 X |

FOREIGN PATENT DOCUMENTS

| | | | |
|---|---|---|---|
| 84162 | 4/1955 | Denmark | 222/218 |
| 3468 | of 1877 | United Kingdom | 222/218 |

Primary Examiner—Joseph J. Rolla
Assistant Examiner—Kevin P. Shaver
Attorney, Agent, or Firm—Joseph T. Harcarik; Thomas R. Savoie; Daniel J. Donovan

[57] ABSTRACT

A rotary volumetric piston dispenser is provided which receives material from a manifold assembly, portions that material while it traverses a path to a dispensing location, and dispenses the portioned material at the dispensing location. The rotary volumetric piston dispenser is suitable for timed communication with a movable belt or the like in order to deposit the portioned material according to a predetermined sequence. A camming assembly is also provided which is suitable for use within the rotary volumetric piston dispenser, the camming assembly including a cam track assembly having an adjustable camming pathway in order to vary the radial position of a radially movable element such as a piston while the element moves in a pattern that generally corresponds to the cam track assembly. The rotary volumetric piston dispenser is especially suitable for use in dispensing condiments, whether they be wet or dry, onto a moving surface, such as a plurality of proteinaceous patties spaced along a conveyor belt. One portion of the cam track assembly extends the radially moveable element outward beyond a cylinder of the dispenser to permit a cleaning fluid to be directed outwardly through the cylinder.

3 Claims, 8 Drawing Figures

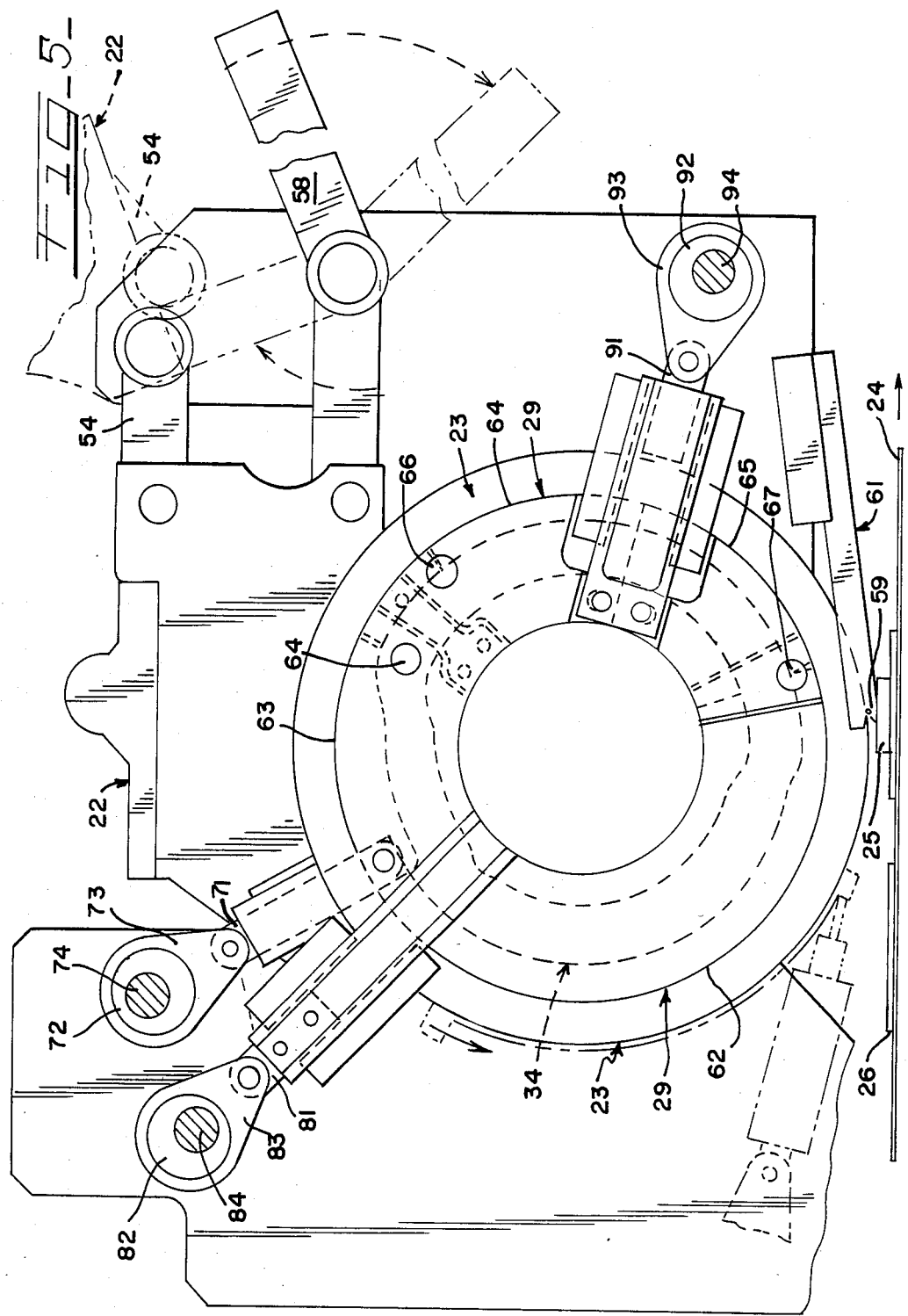

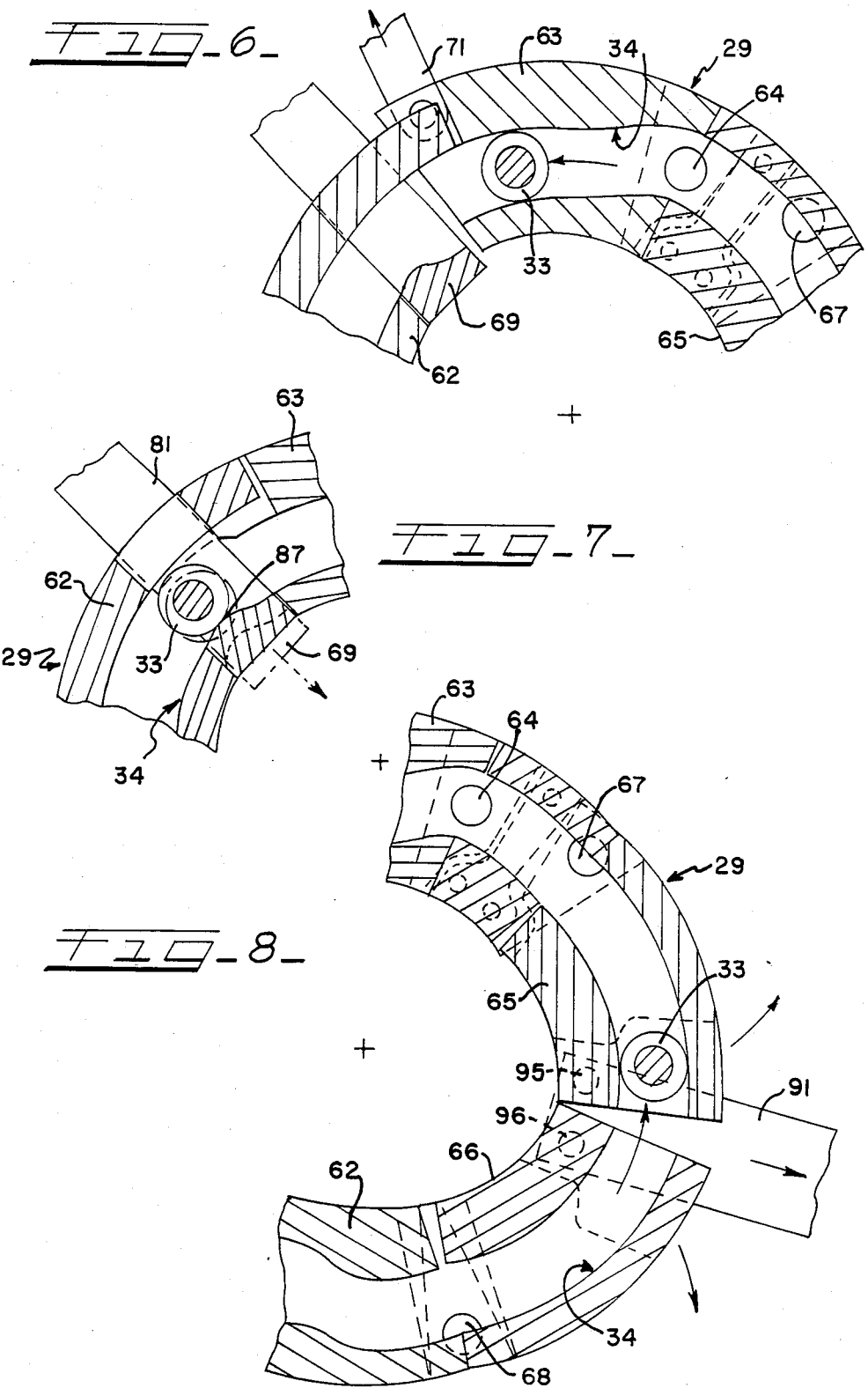

ROTARY VOLUMETRIC PISTON DISPENSER WITH ADJUSTABLE CAMMING ASSEMBLY, AND RINSING DEVICE

BACKGROUND DESCRIPTION OF THE INVENTION

The present invention generally relates to an apparatus including a camming assembly for effecting radially directed movement of a member such as a piston within a rotating assembly, which apparatus is suitable for use as a rotary volumetric piston dispenser for directing and depositing controlled volumes of flowable, particulate and/or chunk material in order to deposit portioned or discrete volumes of the material in a predetermined pattern. The apparatus is particularly well suited for forming condiment materials into discrete volumes or portions and delivering such condiment portions in a predetermined pattern onto a moving surface or the like. An important application of the apparatus includes delivering such condiment portions onto proteinaceous patties that are positioned on a moving conveyor belt in a pattern that substantially corresponds to the pattern by which the apparatus deposits the condiment portions, in order to thereby form a product including a proteinaceous patty having a volume of condiment thereon.

Various devices are available for dispensing materials, including condiments, onto surfaces, including proteinaceous patties. Often, such dispensers are not especially suitable for transporting materials and for depositing selected volumes of those materials at a substantially precise location and/or in a predetermined pattern. When these devices are intended for high volume or industrial uses, precision and durability are important considerations. Other important considerations can include relatively easy, and in some cases automatic, adjustment of the volume of material that is deposited. At times, it is desirable to compact the material in order increase the density of the material portion and/or in order to place the material into a more cohesive form. At other times, especially when the material being handled is a food material, it is important to provide a transporting and depositing apparatus that is readily cleaned in a thorough and efficient manner.

These various features can be incorporated into an apparatus according to this invention which transports and directs materials to form them into discrete volumes or portions and which deposits those discrete portions in a predetermined pattern. The apparatus includes a camming assembly having a cam track that receives a cam follower which operatively engages and imparts generally radial movement to a member such as a piston that rotates within a rotary support assembly for the piston, such as a drum assembly. The material that is to be transported, to be formed as a portion of predetermined shape and volume and to be deposited at a desired location is first positioned on the piston or the like at a predetermined location along the periphery of the rotary support assembly. While on the rotary support assembly, this material is fashioned as the desired portion, and this portion of material is separated from the rotary support assembly and deposited as needed, which may be onto a moving surface.

In an especially advantageous aspect of the invention, the camming assembly provides an adjustable camming pathway by including a movable section in the cam track assembly. One or more of these movable sections may be provided in order to adjust the radial movement of the piston or the like to thereby accomplish functions such as adjusting the volume of the portioned material, compressing the portioned material, and cleaning the apparatus.

It is a general object of the present invention to provide an improved apparatus for dispensing materials.

Another object of this invention is to provide an improved apparatus for shaping, transporting and depositing materials as shaped, discrete volumes or portions, which are dispensed according to a predetermined pattern.

Another object of the present invention is to provide an improved apparatus for depositing discrete volumes of materials onto a moving conveyor in accordance with a predetermined pattern.

Another object of this invention is to provide an improved apparatus for depositing portions or discrete volumes of material onto products as they are conveyed past the apparatus.

Another object of the present invention is to provide an improved apparatus for depositing condiment materials onto conveyed proteinaceous patties such as meat and/or vegetable patties that may be round, square, or otherwise shaped.

Another object of the present invention is to provide an improved apparatus in the nature of a rotary volumetric piston dispenser or filler.

Another object of this invention is to provide an improved camming apparatus having an adjustable camming pathway.

Another object of this invention is to provide an improved apparatus which forms materials into portions that can be adjusted in volume as desired, which portions optionally can be compressed to crush the material and/or to increase the density of the portion.

Another object of the present invention is to provide an improved rotary volumetric piston dispenser or filler apparatus that can be readily and effectively cleaned.

Another object of the present invention is to provide an apparatus that transports, portions, shapes and deposits materials according to a predetermined pattern, whether those materials are substantially liquid or solid.

These and other objects, features and advantages of this invention will be clearly understood through a consideration of the following detailed description.

BRIEF DESCRIPTION OF THE DRAWINGS

In the course of this description, reference will be made to the attached drawings, wherein:

FIG. 5 is an end elevational view of the dispensing apparatus and camming assembly of FIG. 3, in which the manifold assembly is in section;

FIG. 6 is a cross-sectional view of a portion of the camming assembly that effects a radial adjustment of a member such as a piston, which structure is suitable for adjusting the volume of material that is dispensed by the dispensing apparatus;

FIG. 7 is a cross-sectional view of a portion of the camming assembly, which portion provides abrupt, radially directed movement of a member such as a piston, this structure being suitable for applying crushing or compressive forces to the material being dispensed by the dispensing apparatus; and FIG. 8 is a cross-sectional view of a portion of the camming assembly which provides extraordinary outwardly directed movement of a member such as a piston, by which structure such a piston can be extended completely out of its cylinder in order to facilitate clean-up operations.

DESCRIPTION OF THE PARTICULAR EMBODIMENTS

Figure 1:
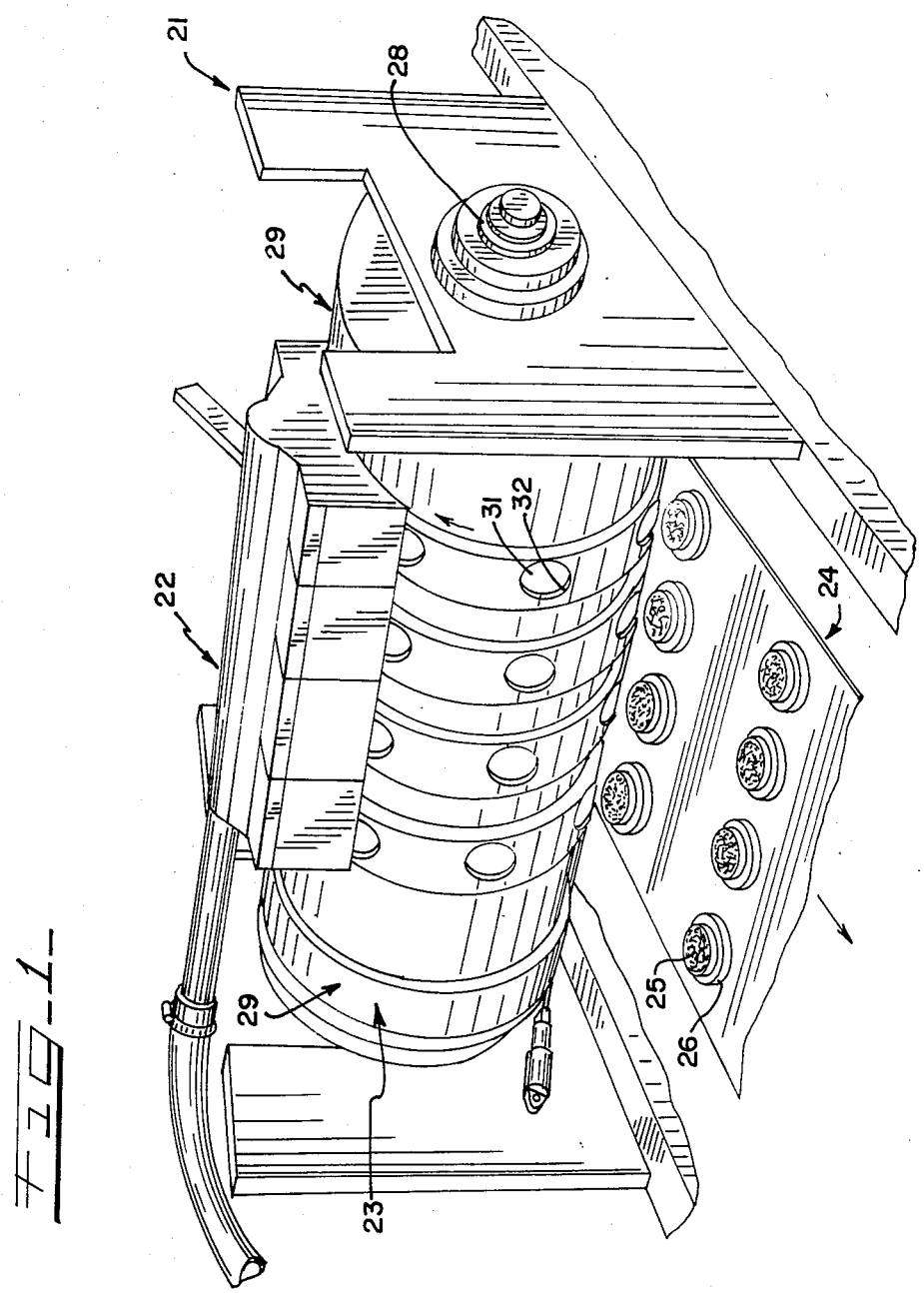
FIG. 1 is a perspective view of a preferred embodiment of the dispenser apparatus according to this invention, shown depositing side-by-side lanes of condiment portions onto spaced proteinaceous patties while the patties move along a conveyor pathway.

The detailed description of the invention that is provided herein is directed primarily to an important aspect of the invention, which aspect is its usefulness as a rotary volumetric piston dispenser, generally designated as 21 in FIG. 1, that is especially useful for depositing condiment material onto proteinaceous patties while simultaneously correctly portioning the condiment material into desired unit volumes or portions, which unit volumes or portions are automatically dispensed within a prescribed moving target area. These functions are performed while minimizing dripping, spilling or waste of the material being dispensed.

For ease of understanding and discussion, the detailed description hereof is in terms of utilizing the apparatus as a rotary volumetric piston dispenser of a condiment onto a moving target such as a proteinaceous patty moving on a conveyor belt. It is to be understood that the apparatus is suitable for rotary volumetric piston dispensing of other materials. Additionally, the camming assembly of the illustrated dispensing apparatus is suitable for effecting radially directed movement of a piston or of a member other than a piston that is part of a rotatable assembly.

With more particular reference to the preferred rotary volumetric piston dispenser embodiment of the invention, dispenser 21 includes a manifold assembly, generally designated as 22, for transporting condiment material and the like to a rotary assembly, generally designated as 23, which correctly portions the condiment material and dispenses the portioned volume of condiment material onto a moving conveyor assembly, generally as designated as 24. In an especially advantageous aspect of the apparatus, the rotary assembly 23 dispenses a portioned condiment unit 25 onto a proteinaceous patty or the like 26 that is positioned on the moving conveyor assembly 24, the dispensing of the portioned condiment unit 25 being in timed relationship to a plurality of moving proteinaceous patties 26.

The rotary assembly 23 is rotatably driven by a suitable drive assembly including a drive sprocket 27 (FIG. 2) and a drive shaft 28. Rotary assembly 23 is in operative engagement with a non-rotating cam assembly, generally designated as 29. Preferably, a pair of cam assemblies 29 are positioned adjacent to opposite ends of the rotating assembly 23. Rotating assembly 23 includes at least one and typically a plurality of cam-controlled radial pistons 31 mounted within cylinders 32 of the rotary assembly 23. Pistons 31 and cylinders 32, which may be circular in cross-section or of any other shape, receive condiment material or the like from the manifold assembly 22, form the portioned condiment units 25, and eject the portioned units 25 onto the moving conveyor assembly 24.

Figure 2:
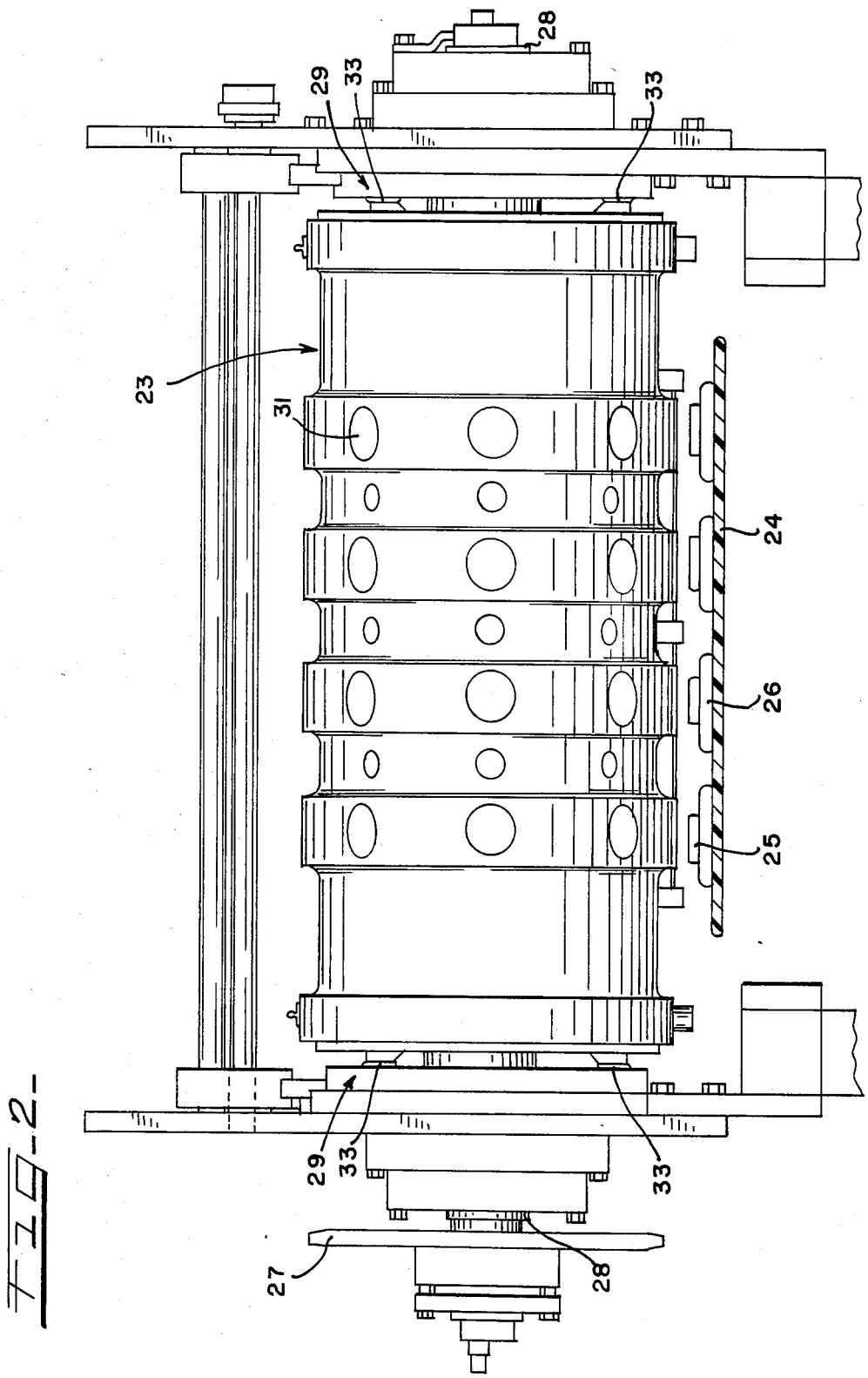
FIG. 2 is an elevational view of the dispenser apparatus illustrated in FIG. 1, with its manifold assembly being removed.
Figure 3:
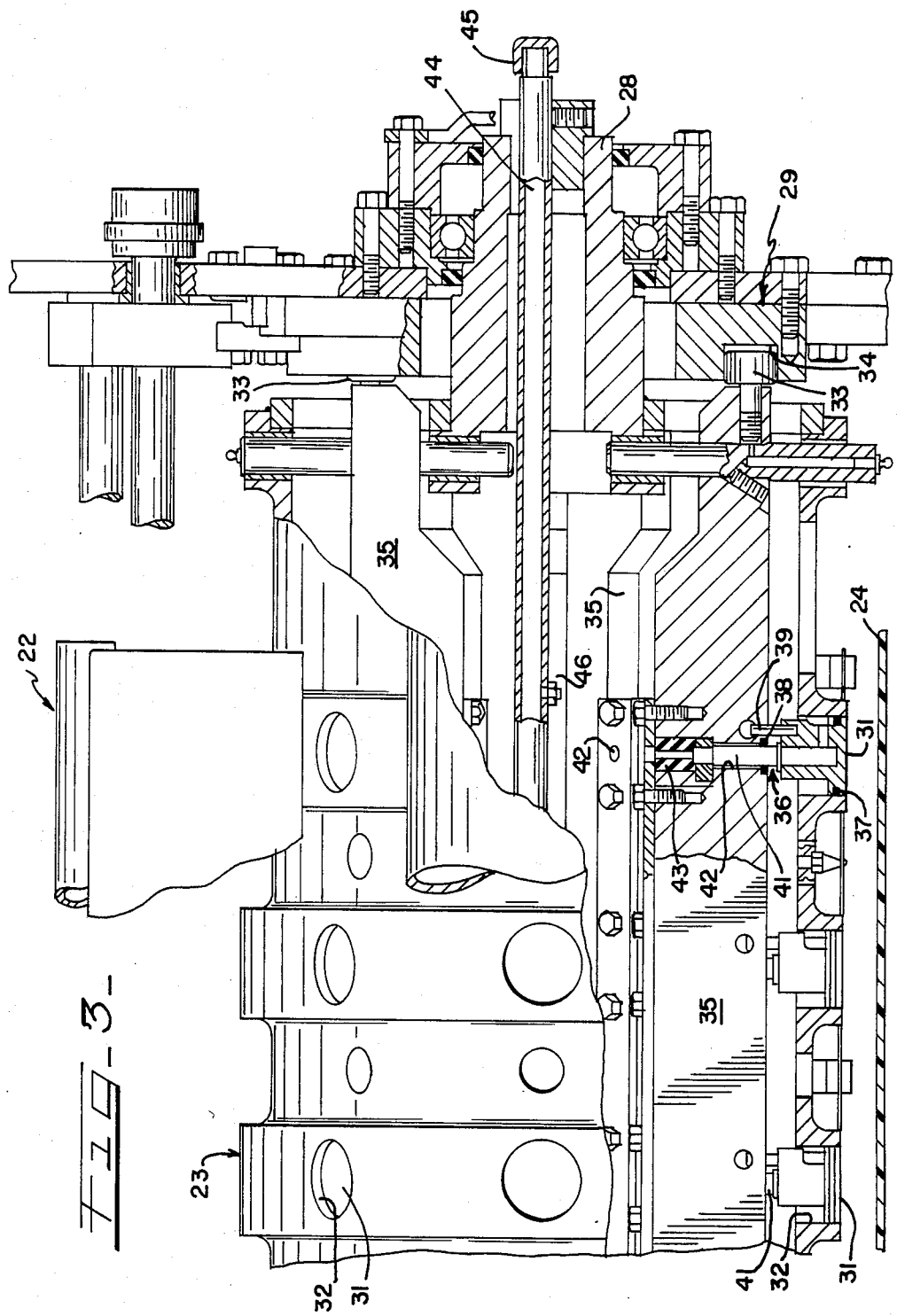
FIG. 3 is a detailed view, partially in section and partially broken away, of a front elevational view of the dispensing apparatus including the camming assembly of this invention.

As can be seen in FIGS. 2 and 3, cam followers 33 are included in the operative engagement between the rotary assembly 23 and the cam assemblies 29. When the rotary assembly 23 is rotated, the cam followers 33 traverse a somewhat circular path through a cam track 34 of the cam assembly 29. In an important aspect of the invention, this cam track 34 is adjustable so as to vary the camming pathway that it provides in order to thereby vary the path that is traversed by the cam followers 33 as they move through the cam track 34.

More particularly, the adjustability feature of the cam assembly 29 permits adjustment of the radial position of each cam follower 33 while it moves through the cam track 34. Each cam follower 33 is mounted to an end of a piston support bar 35, and the radial movement of the cam follower 33 effects a substantially identical radial movement of a piston support bar 35. In the illustrated embodiment, a plurality of piston assemblies, generally designated as 36, are radially mounted along each one of a plurality of piston support bars 35. Radial movement of the cam follower 33 thus causes radial movement of at least one piston 31 of the piston assembly 36 in order to vary the position of the piston 31 with respect to its cylinder 32.

Piston assembly 36 includes an O-ring 37, a seal ring 38, a guide pin 39 and a piston shaft 41 that is slidably mounted within a radially directed bore 42 through the piston support bar 35. Preferably, a spring element 43 is positioned within the bore 42 to provide cushioning forces directed onto the piston shaft 41 in opposition to internally directed radial movement of the piston shaft 41. Spring element 42 functions as a force relief mechanism for the piston assembly 36.

FIG. 3 illustrates a washing assembly which includes an axial channel 44 for receiving a supply of water or other rinsing fluid under pressure upon removal of an end cap 45. Pressurized washing fluid pouring through the channel 44 exits through one or more nozzles 46 in order to provide a flow of washing fluid that is outwardly radially directed into the rotary assembly 23. Most importantly, such washing liquid is thus directed to the inside portion of each cylinder 32. Preferably, this washing procedure is carried out when each piston 31 outwardly extends out of its cylinder 32 to an extent that the washing fluid washes down the inside wall of the cylinder 32 and flows in an outward direction out of the cylinder 32, thereby also washing down the piston assembly 36.

Figure 4:
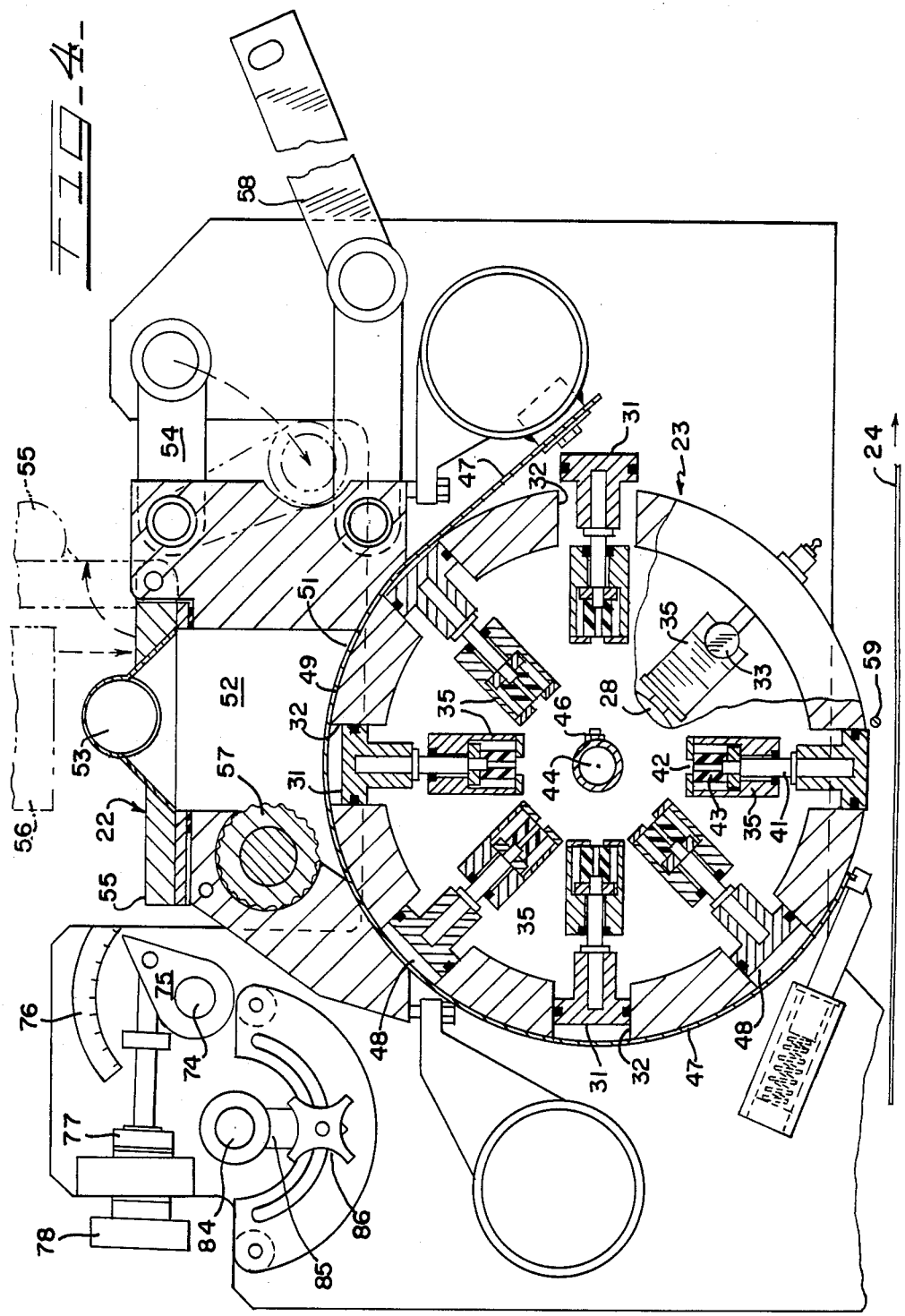
FIG. 4 is an end elevational view, partially in section, of the dispensing apparatus illustrated in FIG. 3.

With more particular reference to the piston assembly 36, FIG. 4 illustrates typical piston positions when the apparatus is used as a rotary volumetric piston dispenser. While substantially any number of piston assemblies could be provided, a total of eight piston assemblies 36 are illustrated, which piston assemblies 36 are mounted within and rotate with the rotary assembly 23 in a counterclockwise direction as shown in FIG. 4.

A strap member 47 is closely wrapped around a portion of an outside circumference of the rotary assembly 23, the strap member 47 having a width that is greater than the diameter or other maximum axial dimension of each cylinder 32 in order to thereby close the cylinder 32 and complete the formation of a volumetric compartment 48 that is bounded by a portion of the strap member 47, the working surface of the piston 31, and the wall of the cylinder 32. Strap member 47 includes a slot 49 that has a length which generally coincides with mouth 51 of the manifold assembly 22. By this structure, the materials to be dispensed that are within the manifold assembly 22 pass out of the mouth 51, through the slot 49, into the cylinder 32 and onto the working surface of the piston 31. The thus filled piston and cylinder continues to rotate until it moves past the slot 49 so as to form the volumetric compartment 48. This volumetric compartment 48 continues to slide along the inside surface of the strap member 47.

When the piston 31 and cylinder 32 rotate beyond the end of the strap member 47, the portioned unit 25 of condiment or the like is free to exit from the cylinder 32, which typically includes having the piston 31 move radially outwardly until the portioned unit 25 is free from the cylinder 32. Removal of the portioned unit 25 from the rotary assembly 23 can be facilitated by positioning a wire 59 in close proximity to piston 31 when it is in its deposit orientation. Wire 59 is strung in an axial direction and is part of a cut-off assembly 61 (FIG. 5).

Another position of the piston 31 is illustrated in FIG. 4, such being associated with the previously discussed washing operation by which a washing fluid is transmitted through the channel 44, each nozzle 46, and each cylinder 32 that is opened by virtue of the extraordinary radial extension of the piston 31 of the type that is illustrated at the three o'clock position of the rotary assembly 23 that is shown in FIG. 4.

Regarding the manifold assembly, such includes a manifold cavity 52 for receiving the material to be portioned and dispensed. Hopper cavity 52 is intended to receive materials of varying consistencies that may be in the nature of a wet material or a dry material, or variations in between. The material filled into the hopper cavity 52 should have at least a limited flowability and can be in the nature of condiments such as sauces, spices, cheeses, bacon pieces, vegetables that are chopped or are in the form of chunks, or cut vegetables. These materials may be compressible, but they need not be, although they should exhibit some viscous proprieties.

The arrangement of the manifold assembly 22 that is illustrated in FIG. 4 is provided for dispensing a material that is substantially plumpable, such as a sauce, the material entering the manifold assembly 22 through a conduit 53. The arrangement of the manifold assembly 22 for materials that are better handled without pumping is illustrated in phantom in FIG. 4. A pivot arm 54 is moved generally downwardly and inwardly as illustrated by the arrow, which movement pivots the manifold cover 55 generally upwardly and outwardly to its phantom position illustrated in FIG. 4, after which a hopper 56 is positioned above the manifold cavity 52. When handling this type of product, it is desirable to include a cylinder 57, preferably one having a fluted surface as illustrated, which cylinder 57 is useful in helping to direct the material into the volumetric compartment 48. When a pumpable product is formed, the cylinder 57 can be substituted with a plug if desired (not shown).

Manifold assembly 22 is readily lifted off of the rotating assembly 23 by generally downward movement of a lift arm assembly 58 as shown by the arrow in FIG. 5. This moves the manifold assembly 22 to its open position as illustrated in phantom in that drawing in order to facilitate cleaning or repair.

Camming assembly 29 is illustrated in greater detail in FIGS. 5, 6, 7 and 8. Cam track assembly 34 includes a fixed section 62, a pivotable section 63 that pivots about a pivot pin 64, and a pair of swinging sections 65, 66, which swing on pivot pins 67, 68, respectively. The illustrated cam track assembly 34 further includes a radially slidable section 69. The respective positions of these various sections of the cam track assembly 34 which are illustrated in FIGS. 6, 7 and 8 result in positioning of each piston 31 or the like at the respective locations that are illustrated in FIG. 4.

More particularly, movement of the pivotable section 63 varies the extent of radial movement of the piston 31 when it is in its orientation for receiving material from the manifold cavity 52. Pivotal movement of the section 63 in a generally outward direction decreases the volume of the material that is received within cylinder 32 from the manifold cavity 52, while generally inwardly directed pivoting of the section 63 increases this volume. This pivoting action is achieved by substantially radially directed movement of a pivot bar 71 of an adjustor assembly that effects closely controlled longitudinal movement of the pivot bar 71. The illustrated adjustor assembly includes an eccentric 72, an eccentric link 73, and a shaft 74 affixed to the eccentric 72. Also included is an assembly (FIG. 4) for pivoting the shaft 74, the illustrated assembly including a combination indicator and rotation link 75, an indicator scale 76, a threadedly mounted shaft 77 for moving the link 75, and an adjustor knob 78 for rotating the shaft 77.

Radially slidable section 69 is moved by means of a slide bar 81, which is a component of an adjustor assembly that is suitable for effecting longitudinal movement of the slide bar 81. The illustrated adjustor assembly further includes an eccentric 82, an eccentric link 83, a shaft 84, combined rotation and indicator link 85, and a locking handle and guide assembly 86. Generally outwardly directed radial movement of the slide bar 81 positions a raised cam track surface 87 along the cam track pathway at the location of the radially slidable section 69, which thereby rapidly directs the moving cam follower 33 outwardly, which in turn causes a rapid outwardly directed movement of the piston 31 in order to thereby compress or crush material within the volumetric compartment 48.

Swinging sections 65 and 66 are pivoted by means of a pivot bar 91, which includes a suitable adjustor assembly such as the illustrated eccentric 92, eccentric link 93, shaft 94, as well as a suitable assembly (not shown) for rotating the shaft 94. The radially directed movement of the pivot bar 91 is transmitted to the swinging sections 65 and 66 through respective pivot pins 95 and 96. Outwardly directed radial movement of the pivot bar 91 radially expands the cam track, with the result that the cam follower 33 moving therethrough traverses a path having an increased radius when compared with the path provided when the pivot bar 91 is retracted. Sufficient movement in this manner results in the desired movement of the piston 31 substantially out of its cylinder 32 in order to facilitate clean-up operations. When the pivot bar 91 is at an inwardly directed location, the cam track defined by the swinging sections 65 and 66 is substantially arcuate, and the piston 31 remains within the mouth of its cylinder 32 until the cam follower 33 is generally inwardly directed by the pivotable section 63.

It will be understood that the embodiments of the present invention which have been described are illustrative of some of the applications of the principles of the present invention. Numerous modifications may be made by those skilled in the art without departing from the true spirit and scope of the invention.

We claim:

1. A rotary volumetric piston dispenser, comprising:
   a rotary assembly that is rotable generally along its central axis, said rotary assembly having a chamber and a radially positioned cylinder extending from and communicating with the chamber, said rotary assembly having an axial channel at its axis and extending therethrough for receiving a supply of rinsing fluid and one or more nozzles connected to said axial channel for directing rinsing fluid outward radially into said rotary chamber;
   a piston that is radially mounted on the rotary assembly and within said cylinder wherein said piston and cylinder define a compartment;
   a cam track assembly generally adjacent to an axial end of said rotary assembly wherein said cam track assembly includes a fixed section, pivotal section means for varying the volume of said compartment, compression means for exerting a radially directed force on the material in said compartment, and swingable section means for radially extending said piston beyond the radial extent of said cylinder, whereby rinsing fluid flows in an outward direction of said cylinder;
   a cam follower received by said cam track assembly, said cam follower being in operative engagement with said piston wherein movement of the cam follower along said cam track assembly effects radial movement of said piston;
   manifold means for depositing material to be dispensed into said compartment;
   means for rotating said compartment to a dispensing location at which the material separates from said compartment and from the rotary assembly and
   a strap member closely wrapped around a portion of the radially extended periphery of said rotary assembly, and said strap member further defines said compartment wherein said strap member includes a slot, said manifold means includes a mouth, and said slot and said mouth open into each other.

2. The rotary volumetric piston dispenser according to claim 1, further including conveyor means at said dispensing location for receiving the material which separates from said compartment and rotary assembly.

3. The rotary volumetric piston dispenser according to claim 1, wherein said dispensing location includes a cut-off assembly.

* * * * *